(12) United States Patent
Zulauf et al.

(10) Patent No.: US 7,344,586 B2
(45) Date of Patent: Mar. 18, 2008

(54) EVAPORATIVE EMISSIONS FILTER

(75) Inventors: Gary B. Zulauf, Findlay, OH (US);
Daniel E. Bause, Flanders, NY (US);
Robert L. Smith, Erie, PA (US);
Ronald P. Rohrbach, Flemington, NJ (US); Richard J. Berkey, Mattawan, OH (US); Bryon W. Stremler, Ontario (CA); Peter D. Unger, Convenet Station, NJ (US)

(73) Assignee: Honeywell International, Inc., Morristown, NJ (US)

( * ) Notice: Subject to any disclaimer, the term of this patent is extended or adjusted under 35 U.S.C. 154(b) by 371 days.

(21) Appl. No.: 10/978,923

(22) Filed: Nov. 1, 2004

(65) Prior Publication Data

US 2005/0145224 A1    Jul. 7, 2005

Related U.S. Application Data

(63) Continuation-in-part of application No. 10/927,383, filed on Aug. 26, 2004, which is a continuation-in-part of application No. 10/806,942, filed on Mar. 23, 2004, now Pat. No. 7,163,574, which is a continuation of application No. 10/392,044, filed on Mar. 19, 2003, now Pat. No. 7,182,802.

(51) Int. Cl.
*B01D 53/02* (2006.01)

(52) U.S. Cl. .............................. 95/143; 96/108; 96/154

(58) Field of Classification Search .................. 96/121, 96/108, 154, 143–147; 95/143–147
See application file for complete search history.

(56) References Cited

U.S. PATENT DOCUMENTS

| 2,201,628 | A | | 5/1940 | McCormick et al. |
|---|---|---|---|---|
| 2,922,418 | A | * | 1/1960 | Heffernan et al. ..... 128/206.15 |
| 3,093,124 | A | | 6/1963 | Wentworth |
| 3,191,587 | A | | 6/1965 | Hall |
| 3,352,294 | A | | 11/1967 | Skarstrom et al. |
| 3,368,326 | A | | 2/1968 | Hervert |
| 3,393,669 | A | | 7/1968 | Vardi et al. |
| RE26,530 | E | | 3/1969 | Wentworth |
| 3,540,423 | A | | 11/1970 | Tolles |
| 3,541,765 | A | | 11/1970 | Adler et al. |
| 3,563,007 | A | | 2/1971 | Clarke |
| 3,572,013 | A | | 3/1971 | Hansen |
| 3,572,014 | A | | 3/1971 | Hansen |
| 3,646,731 | A | | 3/1972 | Hansen |
| 3,678,663 | A | | 7/1972 | Hansen |
| 4,085,721 | A | | 4/1978 | Vardi et al. |
| 4,136,650 | A | | 1/1979 | Manookian, Jr. |
| 4,217,386 | A | | 8/1980 | Arons et al. |
| 4,250,172 | A | | 2/1981 | Mutzenberg et al. |
| 4,261,717 | A | | 4/1981 | Belore et al. |
| 4,279,630 | A | | 7/1981 | Nakamura et al. |

(Continued)

FOREIGN PATENT DOCUMENTS

DE    250469 A1    6/1986

OTHER PUBLICATIONS

International Search Report for PCT/US2005/030779 dated Jul. 13, 2006.

(Continued)

*Primary Examiner*—Robert A. Hopkins (57) ABSTRACT

An evaporative emissions filter for an engine air induction system. The evaporative emissions filter includes a hydrocarbon vapor-adsorbent member disposed within the air induction system outside the direct air flow path. A mechanism is provided for mounting the evaporative emissions filter within the air induction system. Hydrocarbon vapors present in the air induction system after engine shut-down are substantially retained in the adsorbent member until air flows through the air induction system after the engine starts.

11 Claims, 8 Drawing Sheets

U.S. PATENT DOCUMENTS

| | | | |
|---|---|---|---|
| 4,401,447 A | 8/1983 | Huber | |
| 4,409,950 A | 10/1983 | Goldberg | |
| 4,418,662 A | 12/1983 | Engler et al. | |
| 4,513,047 A | 4/1985 | Leach et al. | |
| 4,925,468 A | 5/1990 | Kishi et al. | |
| 5,076,821 A | 12/1991 | Bruhnke et al. | |
| 5,087,273 A | 2/1992 | Ward | |
| 5,129,929 A | 7/1992 | Linnersten | |
| 5,207,808 A | 5/1993 | Haruta et al. | |
| 5,354,365 A | 10/1994 | Youn | |
| 5,466,516 A | 11/1995 | Lutzow et al. | |
| 5,486,410 A | 1/1996 | Groeger et al. | |
| 5,609,761 A | 3/1997 | Franz | |
| 5,620,505 A | 4/1997 | Koch et al. | |
| 5,722,358 A | 3/1998 | Fuesser et al. | |
| 5,879,423 A | 3/1999 | Luka et al. | |
| 5,912,368 A | 6/1999 | Satarino et al. | |
| 6,152,996 A | 11/2000 | Linnersten et al. | |
| 6,200,368 B1 | 3/2001 | Guerin et al. | |
| 6,374,811 B1 | 4/2002 | Mancini | |
| 6,383,268 B2 | 5/2002 | Oda | |
| 6,402,811 B1 | 6/2002 | Shanks et al. | |
| 6,432,179 B1 | 8/2002 | Lobovsky et al. | |
| 6,438,486 B1 | 8/2002 | Mancini | |
| 6,440,200 B1 | 8/2002 | Sakakibara et al. | |
| 6,464,761 B1 | 10/2002 | Bugli | |
| 6,474,312 B1 | 11/2002 | Zulauf et al. | |
| 6,505,610 B2 | 1/2003 | Everingham et al. | |
| 6,565,627 B1 | 5/2003 | Golden et al. | |
| 6,592,655 B2 | 7/2003 | Iriyama et al. | |
| 6,637,415 B2 | 10/2003 | Yoshioka et al. | |
| 6,679,228 B1 | 1/2004 | Confer et al. | |
| 6,692,551 B2 | 2/2004 | Wernholm et al. | |
| 6,692,554 B1 | 2/2004 | Leffel et al. | |
| 6,692,555 B2 | 2/2004 | Oda et al. | |
| 6,698,403 B2 | 3/2004 | Honda et al. | |
| 6,699,310 B2 | 3/2004 | Oda et al. | |
| 6,752,859 B2 | 6/2004 | LaBarge et al. | |
| 6,955,376 B1 | 10/2005 | Labrie et al. | |
| 7,115,199 B2 | 10/2006 | Simonson | |
| 2002/0029693 A1 | 3/2002 | Sakakibara et al. | |
| 2002/0059920 A1 | 5/2002 | Yoshioka et al. | |
| 2002/0083838 A1 | 7/2002 | Incorvia et al. | |
| 2003/0116021 A1 | 6/2003 | Oda et al. | |
| 2003/0145726 A1 | 8/2003 | Gueret et al. | |
| 2003/0145732 A1 | 8/2003 | Leffel et al. | |
| 2003/0183083 A1 | 10/2003 | Hau-Cheng Fu et al. | |
| 2003/0192512 A1 | 10/2003 | Luley et al. | |
| 2003/0196644 A1 | 10/2003 | Braun et al. | |
| 2004/0011197 A1 | 1/2004 | Wernholm et al. | |
| 2004/0050252 A1 | 3/2004 | Wernholm et al. | |
| 2004/0065197 A1 | 4/2004 | LaBarge et al. | |
| 2004/0079344 A1 | 4/2004 | Gimby et al. | |
| 2004/0083894 A1 | 5/2004 | Koyama et al. | |
| 2005/0081712 A1 | 4/2005 | Koslow | 95/90 |

OTHER PUBLICATIONS

Written Opinion of the International Searching Authority for PCT/US2005/030779 dated Jul. 13, 2006.
Abstract of Japanese Patent Application No. JP-405253439 dated May 10, 1993.
Publication of German Patent Application No. DE 101 02 604 dated Jul. 25, 2002.
Publication of European Patent Application EP 1 273 789 dated Jan. 8, 2003.
International Search Report for S.N. PCT/US2004/008031 dated Aug. 19, 2004 (12 pages).
Office Action dated Apr. 18, 2007 for U.S. Appl. No. 10/927,383, filed Aug. 26, 2004.

* cited by examiner

EVAPORATIVE EMISSIONS FILTER

CROSS-REFERENCE TO RELATED APPLICATIONS

This application is a continuation-in-part of U.S. application Ser. No. 10/927,383, filed Aug. 26, 2004; and this application is also a continuation-in-part of U.S. application Ser. No. 10/806,942, filed Mar. 23, 2004 now U.S. Pat. No. 7,163,574, which is itself a continuation of U.S. application Ser. No. 10/392,044, filed Mar. 19, 2003 now U.S. Pat. No. 7,182,802.

BACKGROUND

The present disclosure relates generally to filters, and more particularly to filters useful for adsorbing hydrocarbon vapors.

In internal combustion engines, while the engine is running, there is a constant flow of air through the air induction system into the intake manifold and finally into the combustion chamber through the intake valves. The airflow is caused by the intake stroke of the piston, which draws a vacuum on the intake manifold. This creates an imbalance of pressures between the intake manifold and the environment, and thus air rushes in through the air induction system. Due to the low internal pressure in the intake manifold and the constant airflow into the engine, there are no evaporative emissions from the intake manifold or air induction system.

Further, when a modern, fuel injected engine is running, the fuel system maintains the fuel in the fuel rail(s) at sufficient pressure to prevent the vaporization of the fuel even though the fuel rail(s) may be at a temperature sufficient to vaporize the fuel at normal atmospheric pressure. In fact, good restarting in part may depend on maintaining fuel rail pressure for a number of hours after shut down until the engine cools to prevent fuel vaporization in the fuel rail(s). Fuel vapor in the fuel rail(s) is generally undesirable in that it may lead to long crank times during engine start up.

After engine shut-down, air continues to rush through the air induction system until the intake manifold vacuum is eliminated. Evaporative hydrocarbons may be emitted if the pressurized fuel in the fuel rail(s) leaks into the intake manifold through the fuel injectors. This small amount of fuel may vaporize, and the hydrocarbon vapor may migrate out of the intake manifold through the air induction system to the atmosphere. Heretofore such hydrocarbon vapor egress was considered negligible. However, current regulations in the state of California, as well as in other U.S. states, restrict evaporative emissions from fuel to virtually zero.

Attempts to solve the problem of evaporative hydrocarbon emissions have included placing secondary, hydrocarbon adsorbing filters within the direct air flow path. However, such filters generally add restriction to the air induction system. As such, the engine is generally less efficient, or the air induction system may need to be sized larger in order to provide the same mass airflow with the increased restriction.

Other attempts have included combining hydrocarbon vapor-adsorbing materials with a standard particulate/contaminant air filter. Some drawbacks associated with these combination filters include the possibility of vapor-adsorbing material flaking out of the filter and entering the air system. The loss of adsorbent material may deleteriously affect the vapor adsorbence of the filter.

SUMMARY

An evaporative emissions filter is disclosed for an engine air induction system. The evaporative emissions filter includes a hydrocarbon vapor-adsorbent member disposed within the air induction system outside the direct air flow path. A mechanism is provided for mounting the evaporative emissions filter within the air induction system. Hydrocarbon vapors present in the air induction system after engine shut-down are substantially retained in the adsorbent member until air flows through the air induction system after the engine starts.

BRIEF DESCRIPTION OF THE DRAWINGS

Objects, features and advantages will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION OF THE EMBODIMENTS

It would be desirable to substantially prevent evaporative hydrocarbon emissions from escaping into the atmosphere in order to meet regulations and to become more environmentally friendly. It would further be desirable to achieve such substantial prevention without restricting airflow through the air induction system. Yet further, it would be desirable to achieve this goal relatively inexpensively. It would further be desirable to achieve this goal with a lower likelihood of fouling the adsorbent material compared to a barrier filter.

The evaporative emissions filter of the present disclosure substantially meets the above-mentioned desiderata. The present inventors have unexpectedly and fortuitously also discovered an adsorptive filter/member and method of making and using the same (described further hereinbelow in conjunction with FIG. 3 et seq.) which decreases the amount of adsorptive media conventionally used, while increasing the adsorptive media's surface area that is exposed to a desired gaseous adsorbate, a non-limitative example of which is evaporative hydrocarbon emissions. Without being bound to any theory, it is believed that this may advantageously increase the probability of the adsorptive media's interaction with, and capture of the desired gaseous adsorbate (a non-limitative example of which includes evaporative hydrocarbon emissions).

Figure 1:
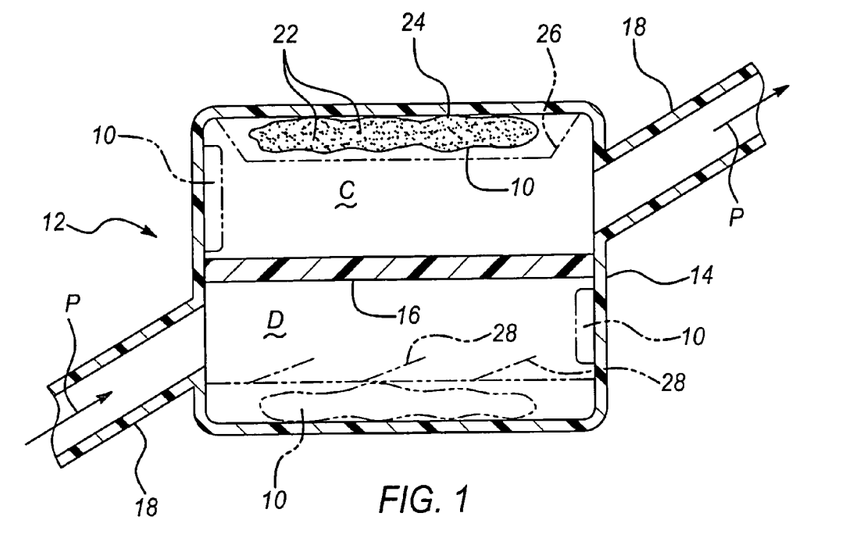
FIG. 1 is a cut away, cross-sectional view of an air filter housing showing an embodiment of the present disclosure therein.

Referring now to FIG. 1, the evaporative emissions filter of the present disclosure is designated generally as 10. The evaporative emissions filter 10 is useful for an engine air induction system 12 having a direct air flow path (arrow P). Air induction system 12 includes a housing/airbox 14 containing a conventional air filter 16. Air filter 16 filters out contaminants in air entering the engine (not shown). Air filters 16 generally have as a main constituent thereof pleated paper housed in a flexible, semi-rigid, or rigid frame. The air filter 16 is mounted within the housing 14, and generally is used once and discarded. Air induction tube 18 carries air from outside the vehicle to the housing/airbox 14 and then to the engine via the intake manifold (not shown).

Figure 2:
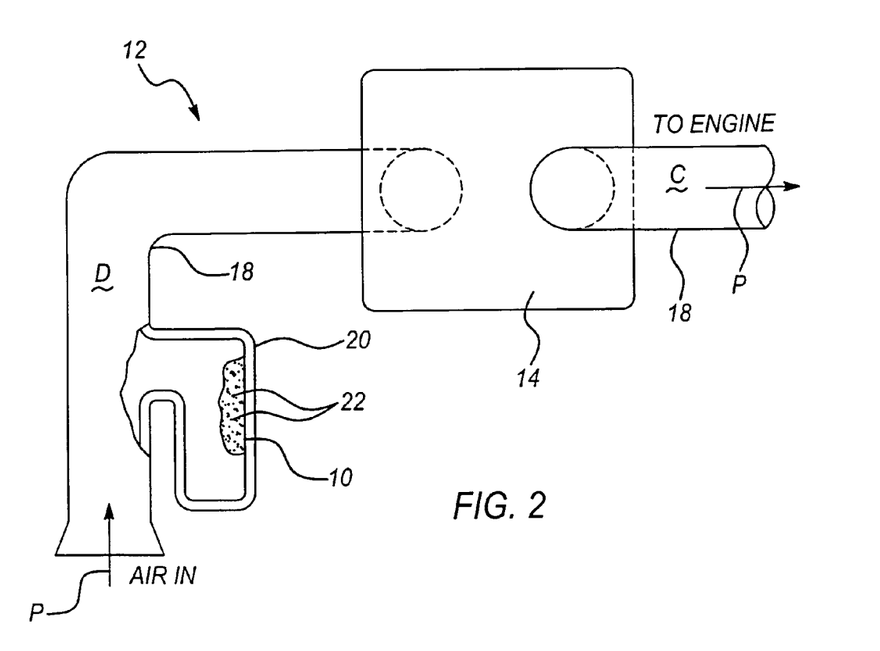
FIG. 2 is a partially cut away, cross-sectional top view of an air induction system showing a further embodiment of the present disclosure therein.

Referring also to FIG. 2, air induction system 12 may optionally include an air resonator 20. The air resonator 20 may be attached to, and in fluid communication with the air induction tube 18 (as shown) and/or the housing 14. It is to be understood that if the optional air resonator 20 is used, it is believed that the evaporative emissions filter 10 of the present disclosure will work substantially equally well whether the air resonator 20 is on the clean side C or dirty side D of the air induction tube 18, or attached to and/or integral with the clean side C or dirty side D of housing 14.

Figure 10:
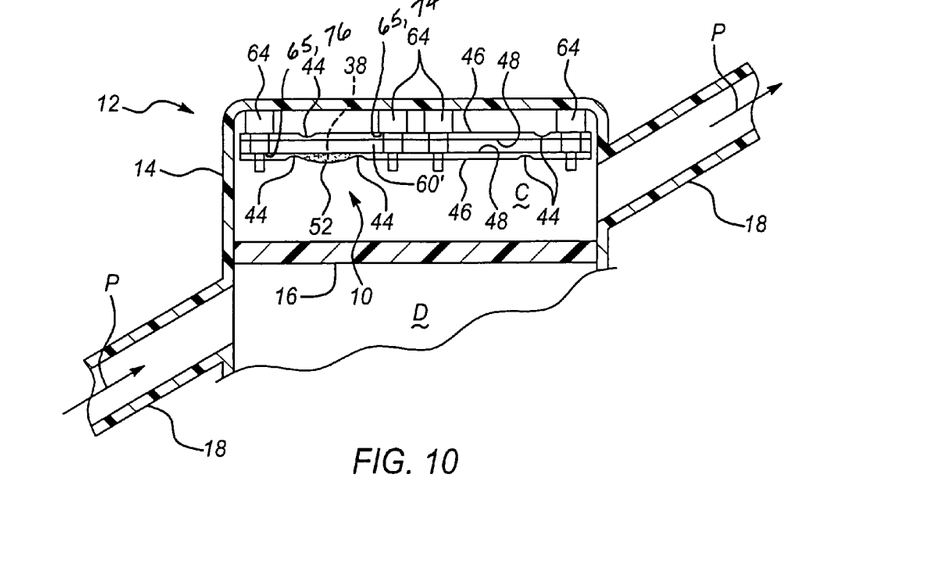
FIG. 10 is a cutaway, semi-schematic cross-sectional view showing the installation of FIG. 9.

The evaporative emissions filter 10 comprises a hydrocarbon vapor-adsorbent member 22 disposed within the air induction system 12 substantially outside of the direct air flow path P. Evaporative emissions filter 10 may further include a mechanism 24 for mounting the evaporative emissions filter 10 within the air induction system 12. It is to be understood that mechanism 24 may include any suitable fasteners, including but not limited to adhesives, hook and loop fasteners, screws, rivets, fasteners that employ ultrasonic or friction welding, flexible tabs that snap the filter 10 in, and the like. Further, the evaporative emissions filter 10 may be mounted to the airbox 14 in such a way that it is mounted off the flat surface (stand-offs) in order to maximize the amount of the adsorbent member 22 exposed to the evaporative emissions (a non-limitative example of such an embodiment is shown in FIG. 10).

If hydrocarbon vapors are present in the air induction system after engine shut-down, the vapors are substantially retained in the adsorbent member 22 until air flows through the air induction system 12 after the engine starts. The return of air flow through the system 12 substantially regenerates the adsorbent member 22.

It is to be understood that evaporative emissions filter 10 of the present disclosure may be placed in any suitable area of the induction system 12 substantially outside of the direct flow path P. In an embodiment of the present disclosure, the filter 10 is mounted within the air resonator 20 and/or the air filter housing 14.

In an alternative exemplary embodiment of the present disclosure, the filter 10 is mounted within the air resonator 20 (as seen in FIG. 2).

In a further embodiment of the present disclosure, the filter 10 is mounted within the air filter housing 14 on the clean air side C of the housing 14.

In yet a further embodiment of the present disclosure, the filter 10 is mounted within the air filter housing 14 on the dirty air side D of the housing 14 (as seen in FIG. 1).

Still further, in an embodiment of the present disclosure, one evaporative emissions filter 10 is mounted within the air filter housing 14 on the clean air side C of the housing 14, and a second filter 10 (a second, third and fourth filter 10 is shown in phantom in FIG. 1) is mounted within the air filter housing 14 on the dirty air side D of the housing 14. Although an optional filter 10 is shown at the bottom of airbox/housing 14 in FIG. 1, it is to be understood that it is not necessary to install a filter 10 at that position.

As shown in FIG. 1, in yet a further embodiment of the present disclosure, a filter 10 is mounted on at least three internal walls of the housing 14.

It is to be understood that the adsorbent member 22 may include any suitable hydrocarbon vapor-adsorbing material. In an embodiment of the present disclosure, examples of the hydrocarbon vapor-adsorbing material include, but are not limited to at least one of activated carbon, zeolites, cyclodextrins, hydrophobic cellulose, liquid phase absorbents (e.g. silicon oils), and/or mixtures thereof. In a non-limitative embodiment of the present disclosure, the adsorbent member 22 has as a main component thereof activated carbon. It is to be further understood that the hydrocarbon vapor-adsorbing material may be in any suitable form and housed/impregnated within any suitable media.

In an embodiment, the hydrocarbon-vapor adsorbing material may be contained by one or more fine mesh screens. It is to be understood that the fine mesh screen(s) may be formed from any suitable materials, including but not limited to polymeric materials, metal materials, and/or mixtures thereof. One non-limitative example of a suitable polymeric material is polyvinylidene chloride, commercially available from Dow Chemical in Midland, Mich. under the tradename SARAN.

Some non-limitative examples of carbon impregnated filtration structures are commercially available from AQF Technologies LLC in Charlotte, N.C. Other suitable non-limitative examples of adsorbent media are disclosed in U.S. Pat. No. 5,486,410, which is incorporated by reference herein in its entirety. The '410 patent discloses, among other embodiments, a filtration structure of a composite staple having a nylon sheath and a polyester core, with activated carbon particles bonded to the fiber matrix, and including a microfiber web located within the structure. Yet other suitable adsorbent media include activated carbon commercially available from PICA USA, Inc. in Columbus, Ohio.

It is further believed that wood based carbon may provide certain advantages, such as for example, in regeneration of the carbon bed.

In order to extend the life of the hydrocarbon vapor-adsorbent member 22, in some instances it may be desirable to protect evaporative emissions filter 10 with an optional protective member(s) such as a hinged flapper 26, louvres 28, a combination thereof, and/or the like. The flapper 26 and louvres 28 are each shown semi-schematically and in phantom in FIG. 1. The flapper 26 remains substantially closed when the engine is running, thereby substantially protecting adsorbent member 22 from water, debris and/or other contaminants. Flapper 26 then falls open when the engine is shut down in order to permit ingress of hydrocarbon vapors that may be present. The louvres 28 are designed so as to deflect water, debris and/or other contaminants away from adsorbent member 22.

Even without a separate protecting member 26, 28, the location of the present disclosure 10 outside of the direct flow path P, i.e. in a lower flow area, such as for example, in the airbox 14 or resonator 20, results in less stress and less contamination of the adsorbent member 22 (compared to a barrier filter), thus leading to longer life of the evaporative emissions filter 10.

A method according to an embodiment of the present disclosure for adsorbing hydrocarbon vapors from an automotive engine air induction system 12 after engine shut-down, includes the step of operatively placing the evaporative emissions filter 10 substantially outside of the direct air flow path P and within at least one of the air resonator 20 and the air filter housing 14, the evaporative emissions filter 10 including hydrocarbon vapor-adsorbent member 22. Hydrocarbon vapors present in the air induction system 12 after engine shut-down are substantially retained in the adsorbent member 22 until air flows through the air induction system 12 after the engine starts.

Due at least in part to Brownian movement of the hydrocarbon molecules (e.g., random movement of the molecules and collisions with each other and the housing) as well as temperature differences and the confined space of the housing, the hydrocarbon molecules do not travel in the same direction and thus, the evaporative emissions filter 10 of the present disclosure is not required to be a barrier type device (i.e., a device through which the air must pass through). By disposing the evaporative emissions filter 10 substantially outside the direct air flow path and/or substantially outside an air inlet path, the same 10 is not required to be integrated with the air filter 16. As such, the evaporative emissions filter 10 does not decrease the flow rate of the air induction system 12 (as would a barrier type device). Thus, placing the evaporative emissions filter 10 substantially outside of the direct air flow path is particularly advantageous and does not adversely affect the performance of the air induction system 12. In addition, and since the evaporative emissions filter 10 is not a barrier type element and merely adsorbs hydrocarbons during engine shut down and releases them into the air inlet path during engine operation, the evaporative emissions filter 10 does not become fouled. As such, filter 10 does not need replacement and therefore may be permanently secured to the air induction system 12.

To further illustrate the present disclosure, the following examples are given. It is to be understood that these examples are provided for illustrative purposes and are not to be construed as limiting the scope of the present disclosure.

EXAMPLES

In alternate trials, A) 36 grams of activated carbon impregnated filter media obtained from AQF Technologies LLC were placed on the top inner surface (clean side) of airbox 14; B) 12 grams of the AQF activated carbon were placed on each of three inner sides of airbox 14: top, and opposed sides of the clean side (similar to a saddle) for a total of 36 grams of activated carbon; C) 36 grams of activated carbon obtained from PICA USA, Inc. and held between two layers of a fine mesh screen were placed on the top inner surface (clean side) of airbox 14; and D) 18 grams of the AQF activated carbon were placed on the top inner surface (clean side) and on the bottom inner surface (dirty side) of the airbox 14, for a total of 36 grams of activated carbon. In each of the alternate trials, 1.5 grams of gasoline vapor were allowed to enter the air induction system 12. In each of the four trials, less than about 0.006 grams of hydrocarbon vapor was emitted to the atmosphere, as compared to the control (no adsorbent media) in which almost 0.04 grams of hydrocarbon vapor was emitted to the atmosphere. Of the four trials, it appeared that trial D was more successful in preventing escape of evaporative hydrocarbon emissions.

The present disclosure is further advantageous in that an effective amount of adsorbent media/member 22 may be calculated for an expected amount of hydrocarbon vapor. As such, that effective amount of adsorbent member 22 may be placed within the air induction system 12 to adsorb that expected amount of hydrocarbon vapor.

Figure 3:
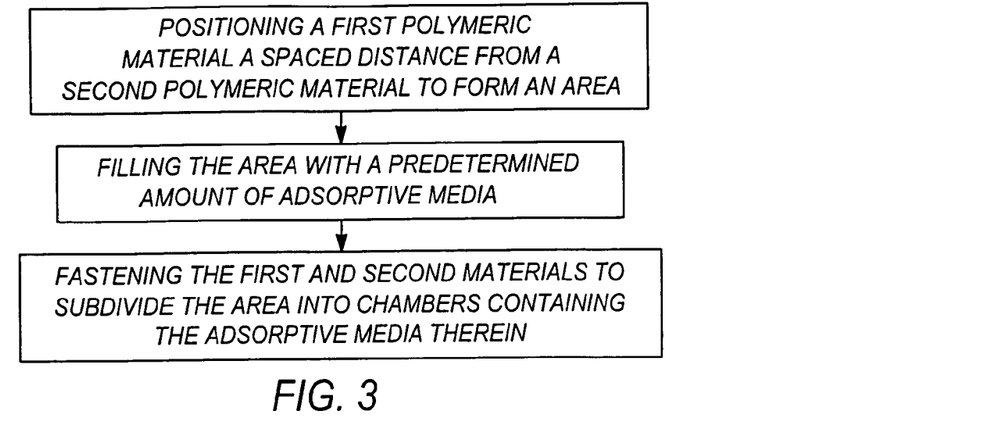
FIG. 3 is a process flow diagram depicting embodiments of the method of forming the adsorptive filter.

Referring now to FIG. 3 et seq., in an alternative exemplary embodiment, the adsorptive filter/member 10 includes a plurality of chambers adapted to substantially evenly distribute the adsorptive media throughout the filter at a substantially uniform thickness. It is to be understood that the substantially uniform thickness may be relatively thin in order to maximize the surface area of adsorptive media utilized in capturing the desired adsorbate (a non-limitative example of which is hydrocarbon vapors). Without being bound to any theory, it is believed that the chambers may also provide substantially enhanced suspension for the adsorptive media to substantially prevent the media from undesirably agglomerating within the filter.

In another alternative exemplary embodiment, the adsorptive filter/member includes an intermediate layer that substantially adds rigidity to the filter.

Further, embodiments of the adsorptive filter/member may advantageously have sufficient flexibility to ease installation of the filter while maintaining sufficient rigidity to substantially obviate the need for a screen mesh and/or frame-like member. This may advantageously reduce the need for additional materials, and thus may result in a decrease in filter weight, as well as a decrease in manufacturing time and/or cost.

Referring now to FIG. 3, an embodiment of the method of making an adsorptive filter/member is depicted. Generally, the method includes positioning a first polymeric material a spaced distance from a second polymeric material to form an area disposed between the first material and the second material. The area may be filled with a predetermined amount of an adsorptive media. The first and second materials are then fastened together, so as to subdivide the area into a plurality of substantially enclosed or partially enclosed chambers. As used herein, "substantially enclosed" or "partially enclosed" is intended to mean that the adsorptive media is substantially maintained within the chambers. Embodiments of the filter/member and method will be discussed in further detail hereinbelow in reference to FIGS. 4A-4D, FIGS. 5A-5E, and FIG. 6.

Figure 4A:
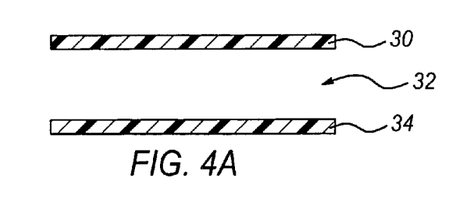
FIG. 4A is a cross-sectional view showing first and second layers of polymeric materials.
Figure 4B:
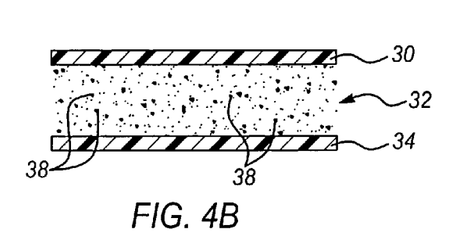
FIG. 4B is a cross-sectional view showing adsorptive media between the first and second layers.
Figure 4C:
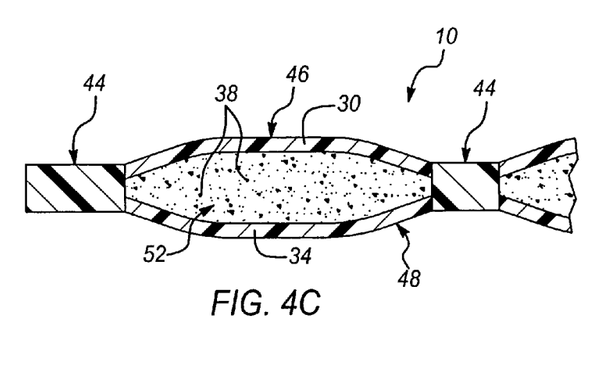
FIG. 4C is a cross-sectional view showing an embodiment of fasteners in place.
Figure 4D:
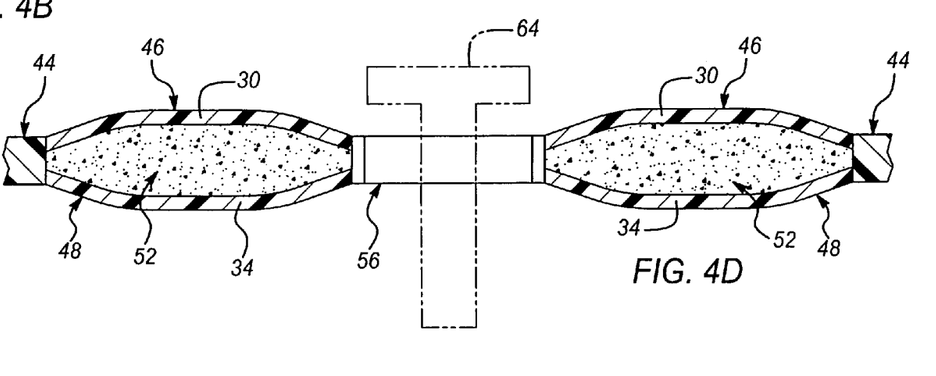
FIG. 4D is a cross-sectional view showing a mounting throughbore.

FIGS. 4A-4D together represent a process flow depicting an embodiment of the method of forming an adsorptive filter/member 10 (as depicted in FIGS. 4C and 4D).

Specifically referring to FIG. 4A, a first layer 30 of polymeric material (referred to herein as "first layer" or "first material") is positioned a spaced distance from (e.g. in an overlying relationship with) a second layer 34 of polymeric material (referred to herein as "second layer" or "second material"). The first and second layers 30, 34 of polymeric material may be a natural material, a synthetic material, and/or a mixture of natural and synthetic materials. It is to be understood that any polymeric material that is capable of being formed as a porous material may be used. In an embodiment, the polymeric material is extruded into fibers which are woven. In an alternative exemplary embodiment, the polymeric material is a porous non-woven material. The first and second layers 30, 34 may be the same, similar, or different materials. However, it is desirable that the polymeric materials be chemically similar enough to be fastened together, if such fastening is accomplished by other than a mechanical means.

Generally, the porous polymeric materials for the first and second layers 30, 34 are configured to have a pore size/mesh size large enough to allow the desired adsorbate to pass through, yet small enough to prevent the adsorptive media from passing through. In an embodiment, the porous polymeric materials' pore size may range, for example, between about 1 µm and about 2000 µm. In a further embodiment when an adsorptive media having a relatively large average particle size is used (e.g. carbon pellets), the porous polymeric materials' pore size may range, for example, between about 200 µm and about 2000 µm. In yet a further embodiment in which an adsorptive media having a smaller average particle size is used (e.g. granular carbon), the porous polymeric materials' pore size may range, for example, between about 100 µm and about 200 µm. In still a further embodiment in which an adsorptive media having a relatively fine average particle size is used (e.g. powdered carbon), the porous polymeric materials' pore size may range, for example, between about 1 µm and about 100 µm.

It is to be understood that any suitable porous polymeric material may be used that is substantially permeable to the desired adsorbate, yet substantially impermeable to the adsorptive media. Some non-limiting examples of suitable polymeric materials include, but are not limited to polyesters, polypropylenes, vinyl copolymers, polycarbonate, acetal, polyvinyl chloride, polyamides, and/or mixtures thereof. It is to be understood that the layers 30, 34 may have any suitable thickness. In an embodiment, the thickness of each of the layers 30, 34 may range between about 0.007 inch (177.8 µm) and about 0.014 inch (355.6 µm).

As depicted in FIG. 4A, an area 32 is formed between the first and second layers 30, 34. It is to be understood that the thickness of the area 32 may be dependent on, among other factors, the positioning of the first and second layers 30, 34. In an embodiment, the thickness of the area 32 ranges between about 0.016 inch (406.4 µm) and about 0.24 inch (6,096 µm). Referring now to FIG. 4B, the area 32 may be adapted to be filled with a predetermined amount of adsorptive media 38. It is to be understood that numerous factors may be taken into consideration when determining the amount of the adsorptive media 38 that should be used. These factors include, but are not limited to the amount of adsorbate that is desired to be adsorbed, the adsorptive capacity of the adsorptive media 38, the thickness and length of the area 32, the particle size of the adsorptive media 38, and the amount of adsorptive media 38 that is desired in the area 32 upon fastening of the filter 10 (see FIGS. 4C and 4D). In a non-limitative example, the thickness of the adsorptive media 38 is about 0.06 inch (1,524 µm).

Examples of suitable materials for the adsorptive media 38 include, but are not limited to carbon-based materials, zeolites, aluminum silicates, silica gels, cyclodextrins, silicone, and/or mixtures thereof. It is to be understood that of the materials listed, carbon-based materials may have the highest adsorptive capacity. A non-limitative example of a carbon-based material is a wood-based carbon material. Other non-limiting examples of carbon-based materials include powdered carbon, granular carbon, or carbon pellets. In one embodiment, the adsorptive media 38 is activated carbon.

Generally, powdered carbon may have a size ranging between about 1 µm and about 100 µm, granular carbon may have a size ranging between about 100 µm and about 200 µm, and carbon pellets may have a size ranging between about 200 µm and about 3500 µm. A non-limitative example of carbon pellets has a size ranging between about 1780 µm and about 3310 µm. It is, of course, understood that the carbon may have a size greater or less than the aforementioned ranges.

Referring now to FIG. 4C, an embodiment of the adsorptive filter/member 10 after a plurality of fasteners or fastened areas 44 has been established is shown. As used herein, fastener 44 is intended to describe an area within the periphery of the evaporative emissions filter 10 wherein the first layer 30 has been secured to the second layer 34 by a mechanical means of a separate instrument (e.g., rivet, etc), adhering (through separate adhesives and/or causing first and second layers 30, 34 to adhere to each other), and/or actual welding (e.g., sonic welding, vibration welding, hot upsetting and laser welding, etc.) wherein a mounting area is provided. In accordance with an exemplary embodiment of the present disclosure, the mounting area may be large enough to provide a supporting surface for interaction with a heat staking member or other mechanical fastener of the desired surface/housing 14 to which the evaporative emissions filter 10 is mounted. See, for example, FIG. 10. It is to be understood that other fasteners 44 or fastener areas may be located within the periphery of the evaporative emissions filter 10 that will not make contact with a heat staking pin 64 of the housing 14 and is provided to aid in substantially uniform distribution of the adsorptive media 38 within the first and second layers 30, 34 of the evaporative emissions filter 10.

Figure 6:
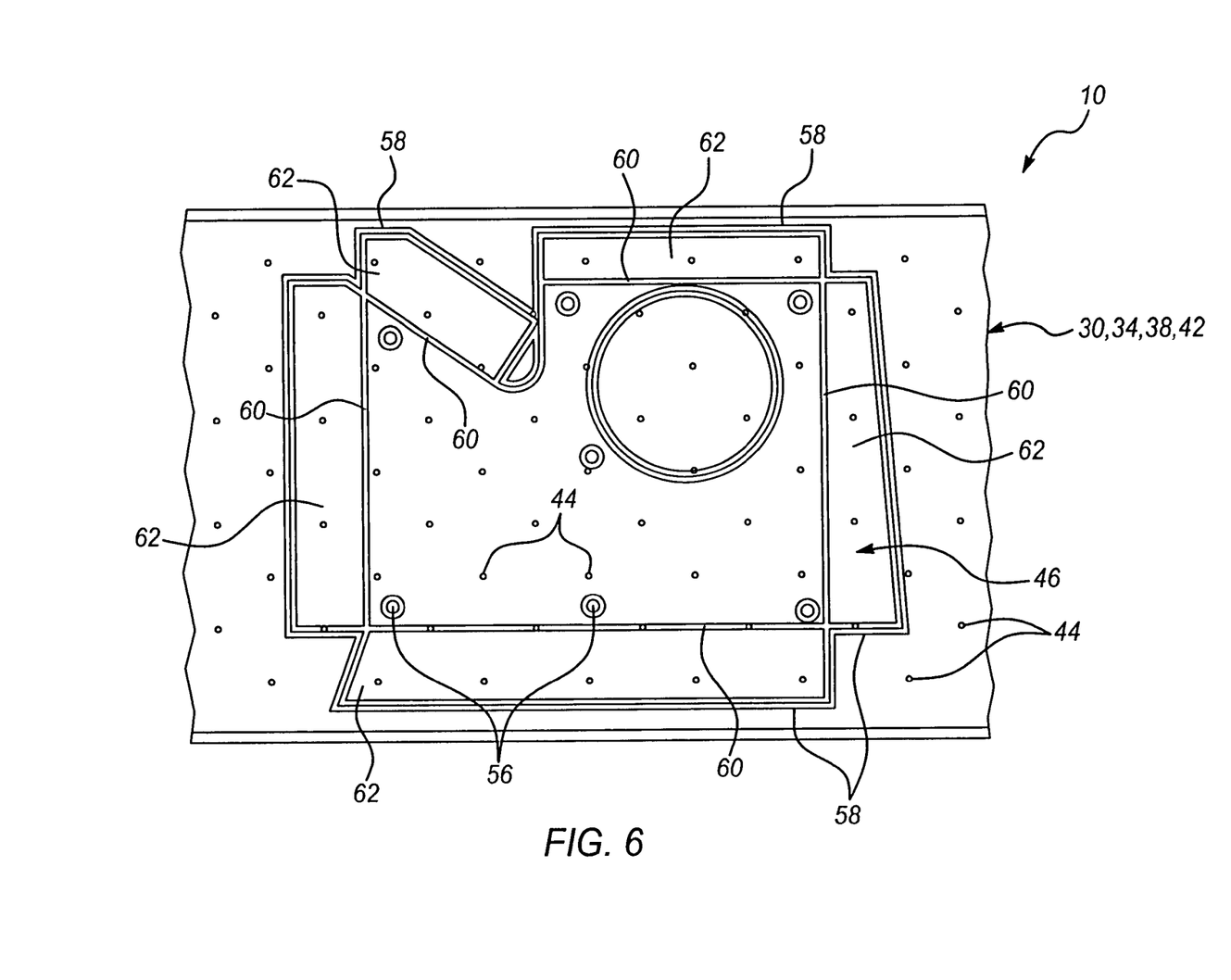
FIG. 6 is a partially schematic top view of an embodiment of the adsorptive filter.

In an exemplary embodiment of the present disclosure, the stack of materials 30, 34, 38 may be fastened at predetermined locations across the outer surfaces 46, 48 of the first and second layers 30, 34 (as best seen in FIG. 6) via any suitable fastener 44, including but not limited to adhesives, rivets, welds, and/or combinations thereof. Non-limiting examples of suitable welding techniques include sonic welding, such as sonic spot welding or seaming, vibration welding, hot upsetting (using resistance heating to heat materials to bond, like soldering), and/or laser welding.

It is to be understood that fastening may be initiated through the first layer 30, the second layer 34, or through both layers 30, 34. As depicted in FIG. 4C, the plurality of fasteners 44 extends from an outer surface 46 of the first layer 30 to an outer surface 48 of the second layer 34. In an embodiment in which the adsorptive media 38 covers substantially the entire surface area of the first and/or second layers 30, 34 prior to fastening, it is to be understood that the plurality of fasteners 44 may also extend through some of the adsorptive media 38.

The plurality of fasteners 44 subdivides the area 32 into a plurality of substantially enclosed and/or partially enclosed chambers 52. It is to be understood that the enclosed chambers 52 contain most or substantially all of the adsorptive media 38 therein. It is believed that the plurality of chambers 52 also advantageously provides substantially even distribution of the adsorptive media 38 throughout the filter/member 10. It is to be understood that, in various embodiments discussed herein (non-limiting examples of which include the embodiment(s) as shown in FIGS. 7-10), chambers 52 may be relatively open to each other to allow some flow of adsorptive media 38 therebetween.

In an alternative exemplary embodiment of the method, the chambers 52 (and first and second chamber 50, 54 shown in FIGS. 5D and 5E) may be formed such that they are initially partially enclosed. In this embodiment, the area 32 (as shown in FIG. 4A without adsorptive media 38) is partially enclosed by establishing some of the plurality of fasteners 44. This alternative exemplary embodiment allows the adsorptive media 38 to be added to the partially enclosed chambers, as opposed to the embodiment in which the adsorptive media 38 is in the enclosed chambers 52 upon formation of the chambers 52. After the adsorptive media 38 is added to substantially fill the partially enclosed chambers, then the chambers 52 are substantially/partially enclosed via establishment of the remainder of the plurality of fasteners 44 (as depicted in FIGS. 4C and 4D), and/or by completion of seam welding (described further hereinbelow).

In still another alternative exemplary embodiment, one chamber 52 may be formed such that it is initially partially enclosed. The chamber 52 may then be substantially filled with the desired amount of adsorptive media 38 and may be substantially/partially enclosed via establishment of the plurality of fasteners 44 and/or by seam welding. Further, the single chamber 52 may be formed with the adsorptive media 38 already therein.

In embodiment(s) of the method, a predetermined amount of the adsorptive media 38 is used. It is to be understood that a substantial amount of the adsorptive media 38 is contained within the enclosed chambers 52. The amount of adsorptive media 38 used may be dependant on, among other things, the amount of adsorbate to be adsorbed and the size of the adsorptive media 38. In an embodiment, the predetermined amount of the adsorptive media 38 used ranges between about 0.1 grams/square inch/side and about 1 gram/square inch/side. In a non-limitative example, one of the enclosed chambers 52 has about 0.35 grams of granular carbon adsorptive media 38 per square inch per side of the enclosed chamber 52.

It is to be understood that the predetermined amount of adsorptive media 38 may be substantially loose within the chambers 52 and does not include binders that may poison and/or otherwise deleteriously affect the media 38 surface area available for adsorption of the desired adsorbate. The loose media 38 and the lack of binders may substantially increase and/or maintain the adsorptive capacity and/or efficiency of the adsorptive media 38 without increasing the amount of adsorptive media 38 disposed within filter/member 10.

In a comparative example, a filter including activated carbon impregnated filter media obtained from AQF Technologies LLC in Charlotte, N.C. is compared to an embodiment of filter 10. Both filters have substantially similar capacities for adsorption of the desired adsorbate. In order to have similar capacities, both filters would include the same amount of carbon having surface area available for adsorption. The filter containing the AQF carbon media contains about 2.9 grams of carbon per cubic inch of the filter; while an embodiment of the filter 10 contains about 4.7 grams of carbon per cubic inch of filter 10. As such, in order for the AQF filter to include as much carbon as the filter 10, it would have to be made larger. This increase in the size of the AQF comparative filter is due, at least in part, to the polymeric fibrous binders attached to the carbon used in the AQF carbon media.

Without being bound to any theory, it is believed that the enclosed chambers 52 are substantially small in size so that may contain substantially small amounts of adsorptive media 38. It is to be understood that a thin (small) layer of the adsorptive media 38 may maximize the surface area of the media 38 available for adsorption. The exposed surface area of the adsorptive media 38 is increased, thereby advantageously offering a greater probability of interaction between the desired adsorbate and the adsorptive media 38, rendering a greater probability of capture of the desired adsorbate in the adsorptive media 38. In a non-limitative example, the exposed surface area of the adsorptive media 38 ranges between about 30 square inches and about 200 square inches.

It is to be understood that the filter/member 10 may be of any suitable thickness. In a non-limitative embodiment, the filter 10 has a thickness of about 0.1875 inch (4,762.5 µm).

Figure 9:
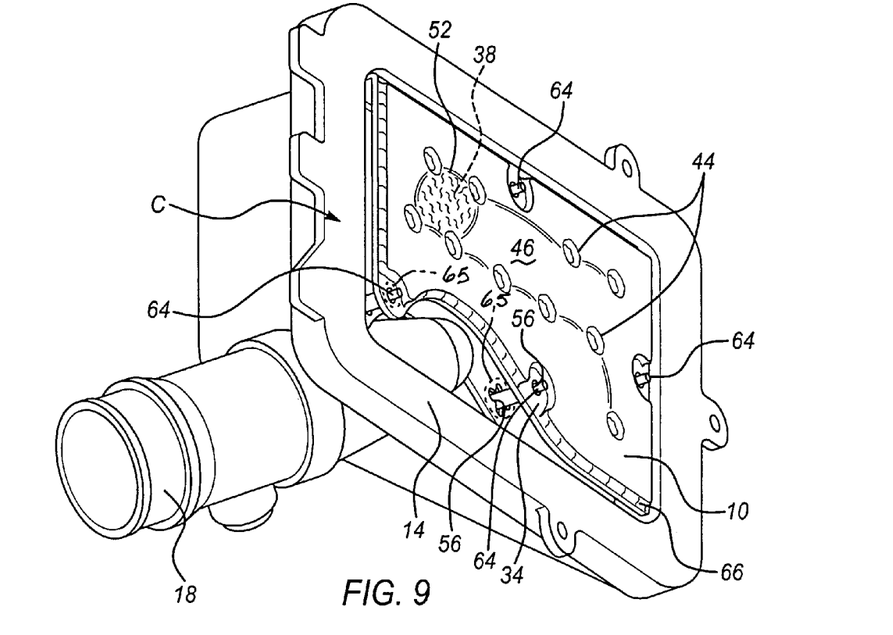
FIG. 9 is a semi-schematic perspective view of the embodiment of FIG. 8, shown attached to the upper surface of the clean side of an automotive airbox 14.

Referring now to FIG. 4D, an embodiment of the method includes forming a plurality of mounting throughbores 56 in the filter/member 10. It is to be understood that the mounting throughbores 56 may be adapted to assist in permanently securing the adsorptive filter 10 to an apparatus in which the filter 10 may be used (e.g. an automotive air induction system). In an alternative exemplary embodiment, the mounting throughbores 56 may be adapted to assist in releasably securing the adsorptive filter 10 to an apparatus in which the filter 10 may be used. In one non-limitative example, the throughbores 56 are adapted to receive attachment members 64 that are configured to mount the adsorptive filter 10 to a desired surface. In an alternate non-limitative example, the throughbores 56 are adapted to receive attachment members 64, for example, heat staking pins (as seen in FIGS. 9 and 10), that are configured to mount the adsorptive filter 10 a spaced distance from the desired surface. This non-limitative example may advantageously increase the exposed surface area of the filter 10 by providing a second gaseous adsorbate flow path between the desired surface and in gaseous communication with one of the outer surfaces 46, 48 of the first and second layers 30, 34. For example, and referring now to FIGS. 9 and 10, opening or throughbore 56 may be configured to rest upon a shoulder portion 65 of attachment member 64. The first gaseous adsorbate flow path is in gaseous communication with the other of the outer surfaces 48, 46 of the second and first layers 34, 30. It is to be understood that either the first layer 30 or the second layer 34 may face the desired surface.

Figure 5A:
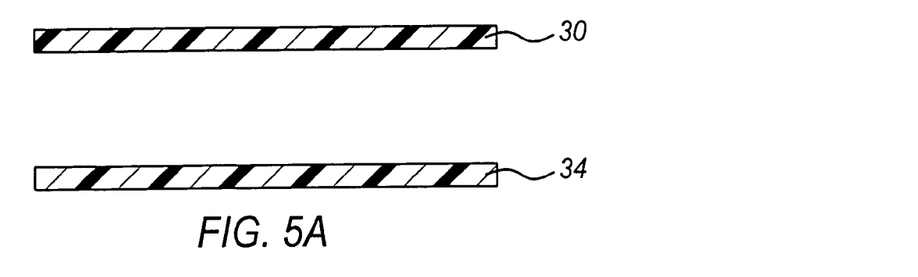
FIG. 5A is a cross-sectional view showing first and second layers of polymeric materials.
Figure 5B:
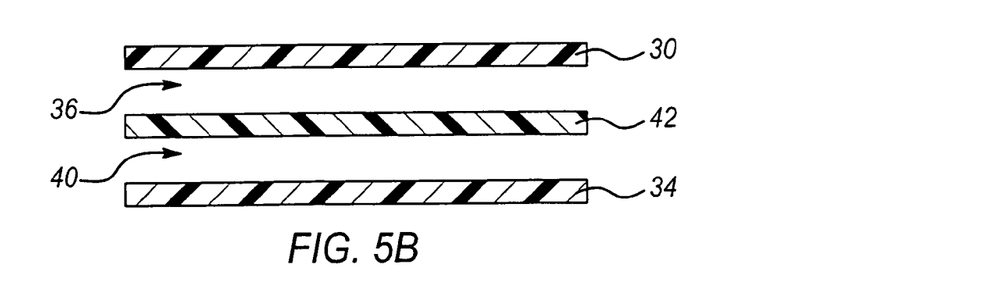
FIG. 5B is a cross-sectional view showing the intermediate layer between the first and second layers.
Figure 5C:
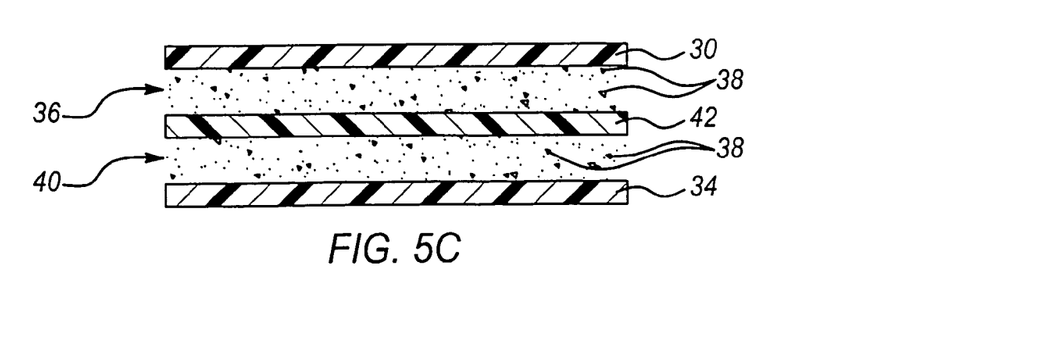
FIG. 5C is a cross-sectional view showing adsorptive media between the first layer and the intermediate layer and between the intermediate layer and the second layer.
Figure 5D:
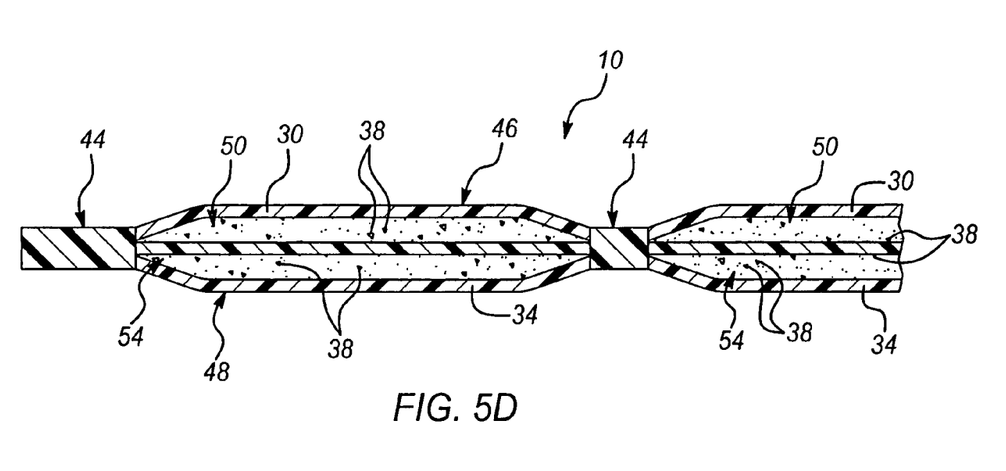
FIG. 5D is a cross-sectional view showing an embodiment of fasteners in place.
Figure 5E:
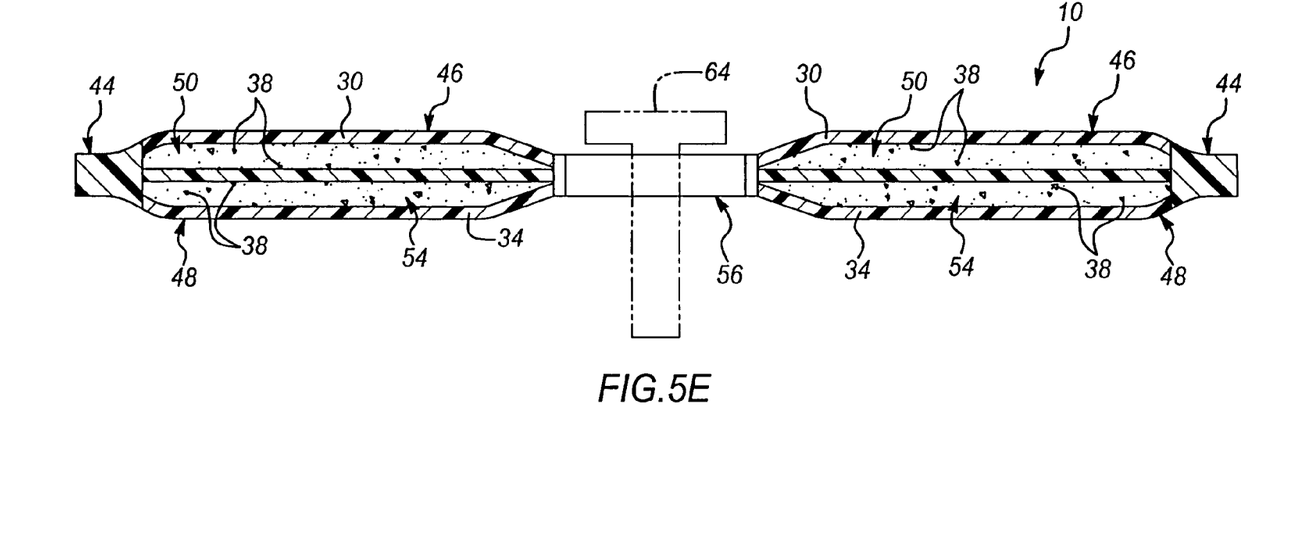
FIG. 5E is a cross-sectional view showing a mounting throughbore.

Together, FIGS. 5A-5E depict a flow diagram of an embodiment of the method of forming an alternative exemplary embodiment of the adsorptive filter/member 10 (as depicted in FIGS. 5D and 5E).

FIG. 5A illustrates the first and second layers 30, 34 a spaced distance apart. This embodiment of the method includes establishing an optional intermediate layer 42 of polymeric material between the first and second layers 30, 34, as depicted in FIG. 5B. In an embodiment, the intermediate layer 42 has a thickness ranging between about 0.0065 inch (165.1 µm) and about 0.0125 inch (317.5 µm). In a non-limitative example, the thickness of the intermediate layer 42 is about 0.0095 inch (241.3 µm). It is to be understood that the intermediate layer 42 may be the same, similar or different material(s) as the first and second layers 30, 34. The intermediate layer 42 may also be substantially permeable to the desired adsorbate while being substantially impermeable to the adsorptive media 38. In an embodiment, the intermediate layer 42 pore or mesh size may be substantially more permeable to the desired gaseous adsorbate than both the first and second layers 30, 34. In addition, the pore size of the intermediate layer 42 being larger than the pore size of the first and second layers 30, 34 may advantageously also provide substantially enhanced suspension for the adsorptive media 38 to substantially prevent the media from undesirably agglomerating within the filter/member 10. As such, the enhanced suspension may increase the available surface area of the adsorptive material 38 to adsorb the desired adsorbate. In an embodiment, pores size may range between about 200 µm and about 1000 µm. In a further non-limitative embodiment, the intermediate layer 42 pore size is between about 250 µm and about 350 µm. As with first and second layers 30, 34, it is desirable that the intermediate layer 42 polymeric material be chemically similar enough to the first and second layers 30, 34 so as to be fastened together, if such fastening is accomplished by other than a mechanical means.

As depicted in FIG. 5B, the addition of the intermediate layer 42 forms a first area 36 disposed between the first layer 30 and the intermediate layer 42 and also forms a second area 40 disposed between the intermediate layer 42 and the second layer 34. It is to be understood that the thickness of the first and second areas 36, 40 may be dependent on, among other factors, the positioning of the first layer 30, the second layer 34, and the intermediate layer 42. In an embodiment, the thicknesses of each of the first and second areas 36, 40 ranges between about 0.008 inch (203.2 µm) and about 0.12 inch (3,048 µm). In a specific non-limitative example, the thickness of each of the first and second areas 36, 40 ranges between about 0.02 inch (508 µm) and about 0.08 inch (2,032 µm).

Referring now to FIG. 5C, the first and second areas 36, 40 may be adapted to be filled with a predetermined amount of the previously mentioned adsorptive media 38. It is to be understood that factors may be taken into consideration when determining the thickness of the first and second areas 36, 40. Examples of the factors include, but are not limited to the amount of adsorbate that is to be adsorbed; the adsorptive capacity of the adsorptive media 38; the thickness and length of the areas 36, 40; the particle size of the adsorptive media 38; and the amount of adsorptive media 38 that is desired in the areas 36, 40 upon fastening of the filter/member 10 (see FIGS. 5D and 5E).

It is to be understood that the intermediate layer 42 may act as a divider such that substantially all of the adsorptive media 38 is not located in the same area of the filter/member 10. The addition of the intermediate layer 42 and the separation of the adsorptive media 38 may advantageously ease the fastening (e.g. welding) process, as each of the first and second layers 30, 34 may fasten to the intermediate layer 42. Such fastening would be through a portion of the thickness of the adsorptive media 38 to layer 42; whereas without intermediate layer 42, the fastening of layers 30, 34 may be through substantially the entire thickness of the adsorptive media 38 (unless the media 38 is added to the filter 10 after first and second layers 30, 34 are joined (partially or substantially completely) to each other). The intermediate layer 42 may also advantageously increase the rigidity of the filter/member 10 without additional parts and/or cost. It is further believed that such added rigidity aids in obviating the need for a frame to contain the filter/member 10. However, it is to be understood that if a frame is desired for a particular end use, the filter/member 10 may also advantageously be utilized within a frame (not shown).

FIGS. 5D and 5E depict the plurality of fasteners 44 subdividing each of the areas 36, 40 into a plurality of substantially/partially enclosed first chambers 50 and substantially/partially enclosed second chambers 54. It is to be understood that the enclosed first and second chambers 50, 54 contain most or substantially all of the adsorptive media 38 therein. It is believed that the plurality of chambers 50, 54, similar to chambers 52, also advantageously substantially evenly distributes the adsorptive media 38 throughout the filter 10.

Referring specifically to FIG. 5E, an embodiment of the method includes forming a plurality of mounting throughbores 56 in the filter 10 (as previously described in reference to FIG. 4D). As described, the mounting throughbores 56 may be adapted to assist in releasably securing or permanently securing the adsorptive filter 10 to an apparatus in which the filter 10 may be used (e.g. an automotive air induction system). The throughbores 56 may also be adapted to receive attachment members 64 that are configured to mount the adsorptive filter 10 to a desired surface or a spaced distance from the desired surface (a non-limitative example of which is an automotive engine air induction system 12).

Embodiment(s) of the method disclosed herein may further include seam welding as desired (and as discussed further hereinbelow). Further, the method may include die cutting the adsorptive filter/member 10 into a predetermined shape. It is to be understood that the filter 10 may be cut into any suitable size and/or shape as desired and/or preferred for a particular end use. FIG. 6 depicts a non-limitative example of a die cut shape that is suitable for the filter 10. In this figure, the outer lines 58 represent the die cut lines, and the lines inward of lines 58 represent the seam weld lines. It is to be understood that the size and/or shape of the cut of the filter 10 may be determined in part by the end use of the filter 10. For example, if the filter 10 is incorporated into an automobile air induction system 12, it is desirable that the shape of the filter 10 be cut to substantially fit the particular system. It is to be understood that the filter 10 may also be cut larger than the apparatus into which it will be placed. In this embodiment, the filter 10 may advantageously be folded and fastened into a size suitable for the apparatus in/on which the filter 10 will be used.

Further, the filter/member 10 may include selectively articulatable members 62 connected to the filter 10 by any suitable means, for example by a living hinge 60 (or any other suitable hinge member). Members 62 may advantageously allow filter 10 to substantially conform to the desired surface. Members 62 may advantageously be formed from layers 30, 34, 38, 42.

In another alternative exemplary embodiment of the method, the first layer 30, the second layer 34, and the intermediate layer 42 (when used) are cut into a predetermined shape prior to the positioning and the establishing of the materials. Thus, the layers 30, 34, 42 may be shaped prior to the formation of the filter 10, as opposed to an embodiment in which the filter 10 is formed and then cut to a desired shape.

As previously indicated, the filter/member 10 may be adapted for use in a variety of applications and/or apparatuses. In a non-limitative example, the filter 10 may be used in an automobile air induction system 12 to trap hydrocarbon evaporative emissions. It is to be understood that after using the filter 10, it may be regenerated for reuse. Regeneration of the filter 10 may be accomplished by increased air flow, temperature swing adsorption (TSA), or pressure swing adsorption (PSA). In TSA, gas may be adsorbed in the adsorptive media 38 at a lower temperature and then may be desorbed from the adsorptive media when the temperature is raised. In PSA however, gas may be adsorbed in the adsorptive media 38 at higher pressures and then may be desorbed from the adsorptive media 38 at lower pressures.

In the embodiment(s) of the method disclosed herein, it is to be understood that each of the components 30, 34, 38 (and optionally 42) may be applied sequentially to form a stack of the materials that is fastened to form the adsorptive filter/member 10. For example, the second layer of polymeric material 34 may be positioned as a bottom layer; a layer of adsorptive media 38 may be established on the second layer 34; the intermediate layer 42 may optionally be established on the layer of adsorptive media 38; an additional layer of adsorptive media 38 may be established on the intermediate layer 42, if used; and the first layer of polymeric material 30 may be established on the layer (additional layer) of adsorptive media 38. The stack of materials/layers 30, 34, 38, and optionally 42 may then be fastened in predetermined places to form the adsorptive filter 10 having the plurality of substantially/partially enclosed chambers 52, or first and second chambers 50, 54.

Figure 7:
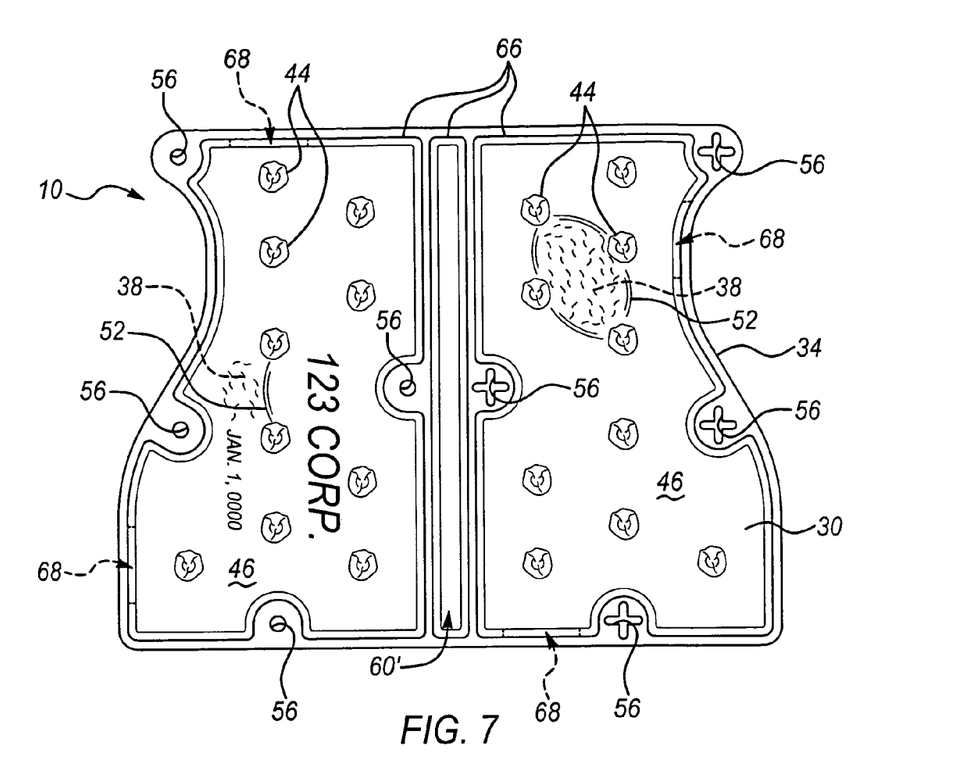
FIG. 7 is a semi-schematic top view of an alternative exemplary embodiment of the adsorptive filter.
Figure 8:
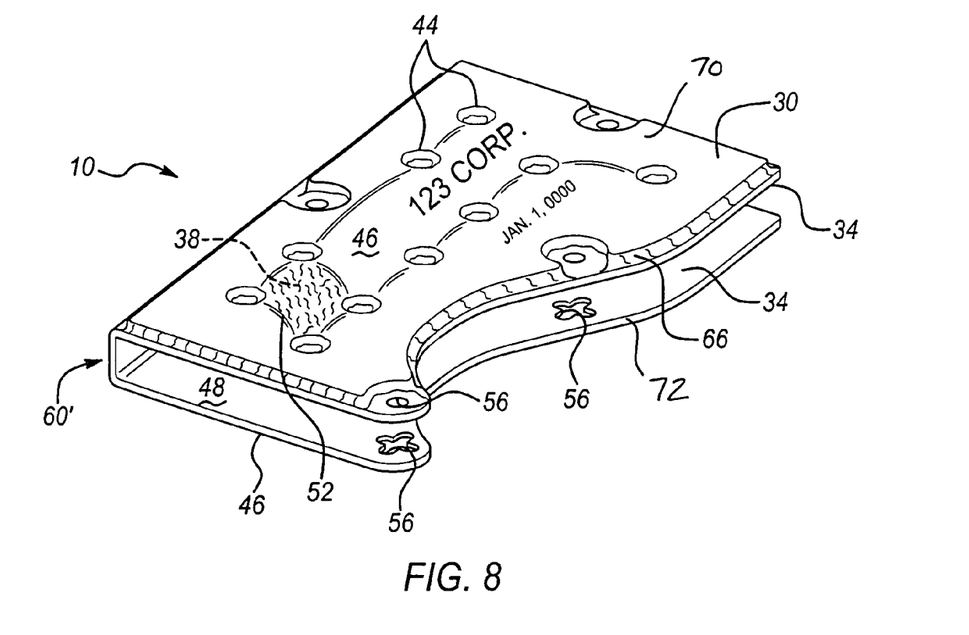
FIG. 8 is a semi-schematic perspective view of the embodiment of FIG. 7, shown in a U-shaped configuration prior to assembly to a desired surface.

Referring now to FIG. 7, an alternative exemplary embodiment of filter 10 is shown. Filter 10 includes first and second polymeric layers 30, 34, and partially enclosed chambers 52 with adsorptive media 38 (shown in hidden line) therein. Seam welds 66 extend around the outer periphery as shown, and around the living hinge area 60' as shown (it is to be understood that a living hinge is but one example of suitable hinge members 60' which may be used). Further, it is to be understood that if filter 10 is substantially permanently formed in the general U-shaped configuration shown in FIGS. 8-10, area 60' may not be a hinge member, but may be a suitable connecting wall/member 60', as desired. Seam welds 66 around area 60' may facilitate use/bending of area 60" as a living hinge 60'.

Optionally, indicia may be placed on either or both of the outer surfaces 46, 48 of first and second polymeric layers 30, 34, respectively. The indicia may be applied by any suitable process, and may be any suitable indicia, as desired, non-limitative examples of which include alphanumeric indicia, graphical indicia, and the like. As shown, the indicia read "123 Corp., Jan. 1, 0000."

In the embodiment shown in FIG. 8, the evaporative emissions filter/hydrocarbon adsorber 10 is folded over into (or optionally, may be substantially permanently formed as) a U-shape or other configuration (e.g., triangular, parallelogram, trapezoid, etc.) wherein the evaporative emissions filter 10 comprises a first member 70 disposed in a facing spaced relationship with a second member 72 wherein the living hinge 60' may define the width of the area between first member 70 and second member 72 if they are parallel to each other. Alternatively, first member 70 and second member 72 may be angularly positioned with respect to each other. In this embodiment, the throughbore 56 of second member 72 is configured to be smaller than or rest upon a first shoulder portion 74 of heat staking pin 64, while throughbore 56 of first member 70 is configured to be smaller or rest upon a second shoulder portion 76 of heat staking pin 64. As illustrated, second shoulder portion 76 is smaller than first shoulder portion 74 thus, when hydrocarbon adsorber 10 is positioned on pin 64, the shoulder portions 65 position first member 70 and second member 72 away from each other, and from the inner surface of the housing 14 from which pin 64 extends. Thereafter, a portion of pin 64 protrudes from first member 70 and is heat staked to from a heat staked portion that is greater in size than the opening of first member 70, thus, substantially preventing removal of the same. This may be particularly advantageous, as the air induction system 12 may comprise a two piece housing 14 (one half of which is shown in FIG. 9) that is able to be opened in order to change a dirty air filter 16. Therefore, the substantially permanent securement of the filter 10 prevents the same from being dislodged during air filter 16 exchange, as the filter 10 is an item that generally does not need replacement.

It is to be understood that filter 10 may also be installed in a substantially flat configuration and/or any other suitable configuration, as desired. Although it is shown folded over/formed with the outer surface 46 of first polymeric layer 30 facing outward, it is to be understood that, if desired, it may be folded such that the outer surface 48 of second polymeric layer 34 may face outward. This embodiment also shows an example of various shapes, sizes and/or configurations of throughbores 56.

Referring now to FIGS. 9 and 10, filter 10 is shown installed in an upper surface of airbox 14. Heat stakes are shown as a non-limitative example of the attachment members 64. After assembly to the desired surface (e.g. the airbox 14) as shown in FIGS. 9 and 10, any suitable process may optionally be used on the portions of heat stakes 64 protruding outwardly from filter 10 so as to substantially prevent (and/or render difficult) removal of filter 10 from the desired surface (such treatment of heat stakes 64 is not shown in FIGS. 9 and 10).

As mentioned hereinabove, and as best seen in FIG. 10, filter 10 may be attached to the desired surface in a "standoff" manner. In this manner, multiple gaseous adsorbate flow paths are provided, one between filter 10 and the desired mounting surface (e.g. the interior of airbox 14); and another between filter 10 and the remainder of the airbox 14. This advantageously may maximize the surface area of adsorptive media 38 to which the gaseous adsorbate is exposed. Further, in the approximately U-shaped configuration of filter 10 shown in FIG. 10, a third gaseous adsorbate flow path may be advantageously formed between the two opposed members of filter 10, which members may be spaced apart a predetermined distance by connecting member/hinge member 60'.

A non-limitative method for forming the filter 10 includes thermoforming first polymeric layer 30 (though it is to be understood that the second polymeric layer 34 may be the thermoformed layer, if desired, etc.) to form wells (which will become a surface of chambers 52); welding (for example, ultrasonically welding) the second polymeric layer 34 (or first polymeric layer 30, if second layer 34 is thermoformed) to the first polymeric layer 30, forming fasteners 44 (a non-limitative example of which includes spot welds) partially enclosed chambers 52 and seam welds 66 (but optionally leaving temporary open areas 68 as an area for media 38 ingress); filling chambers 52 with adsorptive media 38 through areas 68; closing areas 68 (if any) by welding; die cutting filter 10 to a desired shape; and punching throughbores 56 in desired areas. It is to be understood that the media 38 may be placed on the thermoformed layer 30 or 34 before or substantially simultaneous with the placement of the other of layer 34 or 30, and the two layers 30, 34 may be fastened together (e.g. by welding) with the adsorptive media 38 therebetween. In that instance, it would generally not be necessary to leave temporary open areas 68.

It is to be further understood that other suitable methods may be used to form the filter 10 according to various embodiments as described herein, as desired. Some suitable non-limitative examples of methods for making filter 10, as well as some advantages thereof, are as follows.

Figure 11:
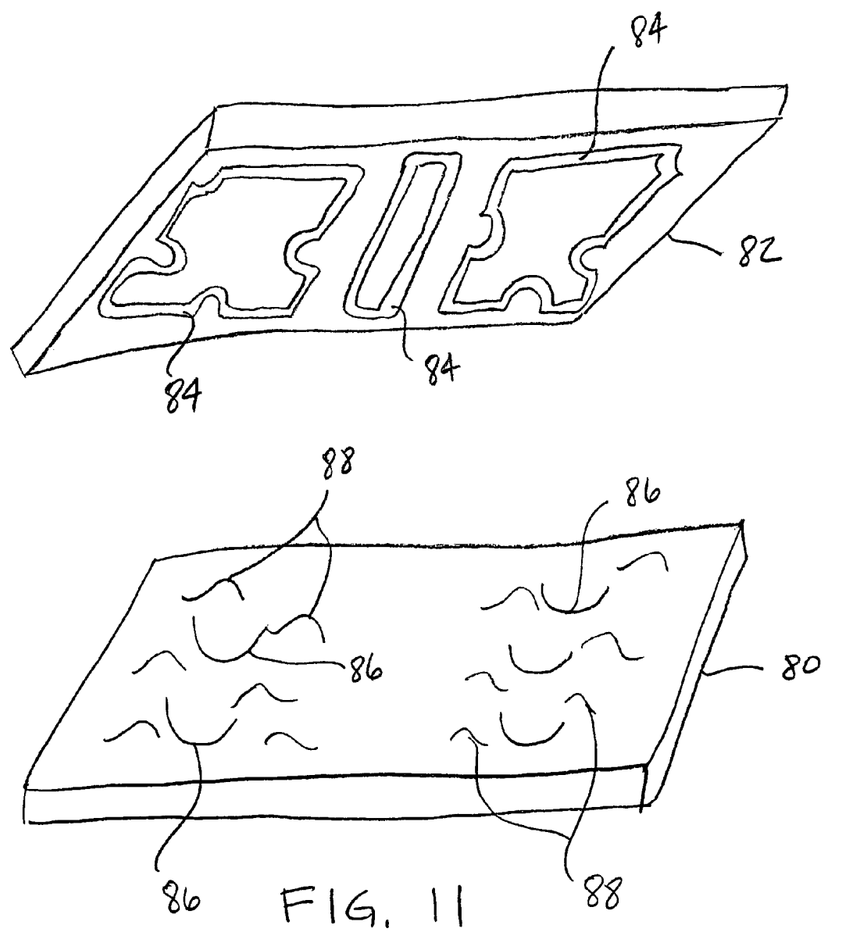
FIG. 11 is a schematic perspective view of an embodiment of a tool(s) for making an embodiment of the filter of the present disclosure.

The thermoformed construction mentioned above may be created by supporting a first layer material (e.g. 30 or 34), and then contacting layer 30 or 34 with a forming shape die 80 with heat. As illustrated in FIG. 11, die 80 is configured to provide the features of the filter 10. Some features are those shown at 86, which will become wells (that later form chambers 52); and other features are those shown at 88, which will become areas that will have fasteners 44 disposed thereon/therein/therethrough. This step of the method forms the wells (mentioned above) into the sheet/layer 30 and/or segment of material. This well may then (or later, as also mentioned above) be filled with adsorptive media 38. A second, substantially flat sheet/layer (e.g. 34 or 30) may then be applied by either heat sealing, vibration welding, sonic welding, and/or the like, wherein the second layer is disposed over the first, and the two are placed over another die 82, which provides features/seams 84 that are formed by the welding process (e.g., sonic welding of the first layer to the second layer). The assembly may then be die cut to the final desired shape using a die template having a configuration matching the periphery of the filter 10.

Another example of a suitable method is an insert mold frame design. This is constructed by using an injection molding tool, and inserting a pre-cut-to-shape fabric 30 or 34. The mold then provides the frame as well as pocketing (to form chambers 52) as needed. The pocketing is then filled with adsorptive media 38, and then a second layer of fabric 34 or 30 is applied to retain the media 38.

Yet another example of a suitable method is an extruded concept. This method extrudes a mixture of media 38 and poly fibers evenly. Then, by using heat, an extruded poly outer layer 30, 34 is applied to each side, respectively. This extruded mat may then be die cut to shape. The die cut part is then placed into either of the above-mentioned constructions, or may have an outer layer significant enough to allow for either of heat sealing or sonically sealing the edge to retain the media 38.

A further example of a suitable method is a foam construction, formed by a foam making process, and then die cut to shape.

Thermoformed construction provides a pocketing concept that may limit the loaded stress that the media 38 can sustain in a bag-like configuration without adding additional components (e.g. a frame). An insert molded frame construction may provide rigidity that may be useful under air flow straightening conditions, as well as providing pockets for even media 38 distribution. Extruded construction with non-woven outer support and similar inner material fibers distributed substantially evenly throughout provides a highly controlled distribution of media 38 over a defined area. Foam construction provides a simplified manufacturing process.

Embodiment(s) of the methods and adsorptive filters/members 10 offer many advantages, including, but not limited to the following. The amount of adsorptive media 38 used in the filter 10 may be decreased while advantageously increasing the adsorptive media's exposed surface area. Without being bound to any theory, it is believed that this characteristic may advantageously increase the probability of interaction with and subsequent capture of the desired adsorbate. Further, the adsorptive filter 10 may include an optional intermediate layer 42 that substantially prevents all of the adsorptive media 38 from being located in the same area of the filter 10, thereby advantageously aiding in fastening layers 30, 34 each to layer 42. Further, layer 42 may substantially increase the suspension for the adsorptive media 38, thereby advantageously increasing the available surface area of the adsorptive media 38. The intermediate layer 42 may also advantageously provide rigidity to the filter 10. Further, embodiments of the adsorptive filter 10 may advantageously have sufficient flexibility to ease installation of the filter 10 while maintaining sufficient rigidity to substantially obviate the need for a screen mesh and/or frame. This may advantageously reduce the need for additional materials, and thus may result in a decrease in manufacturing costs. Still further, embodiments of the filter 10 include loose adsorptive media 38 without the addition of binders, thus substantially increasing and/or maintaining the adsorptive capacity of the filter 10.

While several embodiments of the disclosure have been described in detail, it will be apparent to those skilled in the art that the disclosed embodiments may be modified. Therefore, the foregoing description is to be considered exemplary rather than limiting, and the true scope of the disclosure is that defined in the following claims.

What is claimed is:

1. A hydrocarbon adsorber, comprising:
a first permeable layer of material secured to a second layer of permeable material, wherein a layer of hydrocarbon adsorbent media is disposed between the first permeable layer and the second permeable layer, the hydrocarbon adsorber being configured to define a first portion and a second portion each being secured to each other by a hinge portion, and the first portion is capable of being disposed in a facing spaced relationship with regard to the second portion; and
a plurality of fastening portions defined by the first permeable layer being secured to the second permeable layer and no hydrocarbon adsorbent media is disposed between the first permeable layer and the second permeable at the plurality of fastening portions and a portion of the plurality of fastening portions being located within an area defined by a periphery of the hydrocarbon adsorber.

2. The hydrocarbon adsorber as in claim 1, wherein the first portion has a periphery identical to a periphery of the second portion.

3. The hydrocarbon adsorber as in claim 1, wherein a width of the hinge portion defines the facing spaced relationship between the first portion and the second portion.

4. The hydrocarbon adsorber as in claim 1, wherein the fastening portions assist in uniform dispersement of the hydrocarbon adsorbent media between the first permeable layer and the second permeable layer.

5. The hydrocarbon adsorber as in claim 1, wherein a portion of the plurality of fastening portions have mounting openings disposed therein.

6. A method of securing a hydrocarbon adsorber to a housing of an air induction system, the method comprising:
positioning a first portion of the hydrocarbon adsorber about a plurality of heat staking members of the housing, wherein the first portion is in a facing spaced relationship with respect to the housing;

folding a second portion of the hydrocarbon adsorber over the first portion and the plurality of heat staking members wherein the second portion is in a facing spaced relationship with respect to the first portion; and applying heat to the plurality of heat staking members in order to fixedly secure the hydrocarbon adsorber to the plurality of heat staking members.

7. The method as in claim 6, wherein the hydrocarbon adsorber further comprises a hinge portion disposed between the first portion and the second portion.

8. The method as in claim 6, wherein the plurality of heat staking members each have a first shoulder portion configured for engaging the first portion and a second shoulder portion configured for engaging the second portion.

9. The method as in claim 8, wherein the first shoulder portion is larger than the second shoulder portion.

10. An adsorptive filter for adsorbing a desired gaseous adsorbate, the filter comprising:

a first member;

a second member opposed to, and spaced a predetermined distance from the first member; and a hinge member joining the first and second members;

wherein each of the first member and second member include:

a first layer of a flexible polymeric material having an outer surface;

a second layer of a flexible polymeric material spaced from the first layer to form an area between the first and second layers, the second layer having an outer surface;

a plurality of fasteners located at predetermined areas across the first and second layer outer surfaces, the plurality of fasteners extending from the outer surface of the first layer to the outer surface of the second layer, wherein the plurality of fasteners subdivides the area into a plurality of at least partially enclosed chambers;

a predetermined amount of adsorptive media disposed within each of the plurality of at least partially enclosed chambers, the plurality of at least partially enclosed chambers adapted to substantially evenly distribute the adsorptive throughout the filter;

a plurality of throughbores extending from the outer surface of the first layer to the outer surface of the second layer, and adapted to receive attachment members for mounting the filter to a desired surface; and at least one gaseous adsorbate flow path in gaseous communication with at least one of the outer surfaces of the first and second layers;

wherein each of the first and second layer polymeric materials includes pores that are permeable to the gaseous adsorbate, and wherein each of the first and second layer polymeric materials pores are substantially impermeable to the adsorptive media.

11. The filter as defined in claim 10 wherein the desired surface is an automotive air induction system having a direct flow path, and the gaseous adsorbate is evaporative hydrocarbon emissions, and wherein the air induction system includes an air resonator and a housing containing an air filter, and wherein the filter is mounted within at least one of the air resonator and the air filter housing and substantially outside of the direct air flow path.

* * * * *